United States Patent [19]
Svantesson

[11] 3,799,345
[45] Mar. 26, 1974

[54] APPARATUS FOR EFFECTING PURIFICATION OF LIQUIDS BY FLOTATION

[75] Inventor: Sven Elis Ake Svantesson, Bromma, Sweden

[73] Assignee: Aktiebolaget Electrolux, Stockholm, Sweden

[22] Filed: Feb. 3, 1972

[21] Appl. No.: 223,197

[30] Foreign Application Priority Data
Feb. 9, 1971 Sweden.............................. 1584/71

[52] U.S. Cl................................. 210/109, 210/208
[51] Int. Cl............................................ B01d 43/00
[58] Field of Search............ 210/63, 205, 207, 519, 210/109, 110, 208

[56] References Cited
UNITED STATES PATENTS
3,418,236  12/1968  Mail............................. 210/205 X
3,606,999  9/1971  Lawless............................... 210/63

Primary Examiner—Frank A. Spear, Jr.
Assistant Examiner—F. F. Calvetti
Attorney, Agent, or Firm—Edmund A. Fenander

[57] ABSTRACT

In the purification of liquids by flotation, a mixture of gas and liquid is subjected to sufficient pressure for the gas to dissolve in the liquid and form a solution of the gas and the liquid. The solution of gas and liquid without any substantial change in pressure is introduced at a low velocity to the body of polluted liquid in a flotation tank. Initially no gas bubbles are formed. As the solution rises slowly in the tank and it is subjected to a gradually lower pressure, gas bubbles are formed in a gentle manner. Due to the slow rate at which this takes place the gas bubbles will be very small. Since a great quantity of gas is dissolved in the liquid, a large quantity of gas bubbles will be formed. All of these factors contribute to an effective purification of polluted liquids by flotation.

3 Claims, 3 Drawing Figures

3,799,345

APPARATUS FOR EFFECTING PURIFICATION OF LIQUIDS BY FLOTATION

BACKGROUND OF THE INVENTION

In purifying liquids by flotation, gas bubbles in the polluted liquid serve to carry the polluted matter, such as solid particles or the like, to the surface of the liquid. To accomplish this effectively the gas bubbles desirably are as small as possible to allow sufficient adhesion to the particles. Such adhesion is materially impaired when the size of the gas bubbles increases. Further, large gas bubbles induce upward flow in the body of polluted liquid which disintegrates the flocks formed by the addition of flocculating agents, for example. To obtain effective flotation a very great number of small gas bubbles desirably are formed which means that the greatest possible quantity of gas should be dissolved in the polluted liquid.

DESCRIPTION OF THE PRIOR ART

It is known to introduce into polluted water a so-called dispersion of air in water. This not only provides air dissolved in water but also air bubbles which are both small and large and present in the water from the very beginning which produces a strong upward flow or surge of water that is objectionable.

It is also known to dissolve air under high pressure in a small quantity of water. Due to the decrease in pressure that occurs when the solution of air and water is delivered to the body of polluted water, the resulting spontaneous release of gas in the form of large air bubbles impairs the efficiency which is objectionable because the removal of matter responsible for pollution of the water by flotation will be poor.

SUMMARY OF THE INVENTION

My invention relates to apparatus for effecting purification of liquid by flotation.

It is an object of my invention to provide an improved apparatus for removing by flotation matter which is responsible for the pollution of liquid. Another object is to provide such apparatus which is extremely efficient and yet simple and inexpensive.

I accomplish this by introducing a solution of gas and liquid at a low velocity into a body of polluted liquid in a flotation tank, such solution being formed by subjecting a mixture of the gas and liquid to a definite pressure for an adequate interval of time. The solution is supplied at the low velocity to the flotation tank without any significant change in pressure, so that the sudden or spontaneous formation of gas bubbles is avoided.

In the initial phase or stage no gas bubbles are formed. As the solution rises slowly in the flotation tank and it is subjected to a gradually lower pressure, gas bubbles are formed in a gentle manner. Due to the slow rate at which this takes place the gas bubbles will be very small. Since a great quantity of gas is dissolved in the liquid, a great quantity of gas bubbles will be formed. All of these factors contribute to the high efficiency at which the removal of matter responsible for pollution of the liquid by flotation is effected.

DESCRIPTION OF THE PREFERRED EMBODIMENT

Figure 1:
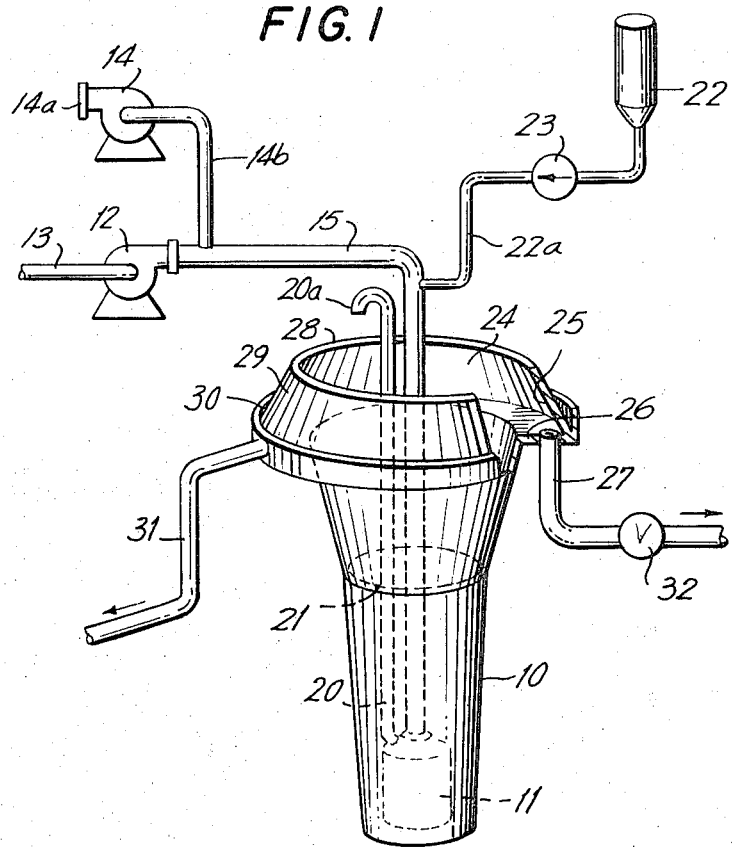
FIG. 1 is a view more or less diagrammatically illustrating apparatus embodying my invention for effecting purification of liquids by flotation.
Figure 2:
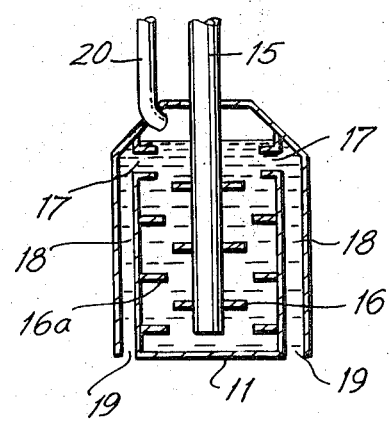
FIG. 2 is an enlarged fragmentary sectional view of parts shown in FIG. 1 to illustrate details more clearly.

Referring to FIG. 1, I have shown my invention in connection with a flotation tank 10 for holding a body of liquid, such as, for example, water to be purified. Within the tank 10 is disposed a vessel 11 to which a mixture of a gas and liquid, such as, for example, air and water, is delivered through a conduit 15.

Liquid is discharged into the conduit 15 from a liquid pump 12 to which liquid is delivered through a conduit 13 from a suitable source of supply. The liquid delivered to the pump 12 desirably may be water to be purified. An air pump 14 draws ambient air into the pump inlet 14a and air under pressure is discharged from the pump through a conduit 14b which is connected to the conduit 15.

A mixture of air and water flows downward in the conduit 15 to the vessel 11. To make certain that air introduced into the conduit 15 will flow downward with liquid to the vessel 11, liquid is discharged from the liquid pump 12 at such a rate that the liquid flows downward in the conduit 15 at a velocity which preferably exceeds 40 cm./sec.

The vessel 11 represents an intermediate region in the path of flow of the gas and liquid. The conduit 15 extends downward within the vessel 11 and the mixture of gas and liquid is discharged from the lower open end of the conduit which is near the bottom of the vessel. With this construction the mixture of gas and liquid must ascend and flow upward for practically the entire height of the vessel 11. The outer surface of the conduit 15 and inner surface of the vessel 11 are respectively provided with baffles or fins 16 and 16a which extend toward one another and serve to stir the mixture of gas and liquid and promote mixing thereof.

The interval of time that the gas and liquid are in contact with one another in the conduit 15 can be disregarded for the reason that the gas and liquid move very rapidly therethrough to the vessel 11. However, the vessel 11 is so constructed and formed that it takes a considerable length of time, preferably at least 3 minutes, for the mixture to move upward through the vessel from the bottom thereof to the higher level at the openings 17 therein. This means that the volume of the vessel 11 is sufficiently large relative to the volume of air-water mixture flowing through the conduit 15 per unit interval of time that it will take at least 3 minutes to flow upward in the vessel. In addition, the vessel 11 is located at a sufficient depth in the body of liquid held in the flotation tank 10 so that the air-water mixture in the vessel will be subjected to a definite high pressure. In this way the air-water mixture in the vessel 11 is subjected for an adequate interval of time to a pressure which is sufficiently high for the air to dissolve in the water to form a solution of the air and water. The pressure to which the air-water mixture is subjected in the vessel 11 can be increased and decreased by respectively lowering and raising the vessel 11 in the body of liquid in the flotation tank.

Accordingly, the air-water mixture flows upward very slowly in the vessel 11 and the air-water solution formed therein flows through the openings 17 into the upper end of a unobstructed passageway 18 or cylindrical shape for downward flow therein. The air-water solution is discharged from the lower open end 19 of the passageway 18 into the body of water held in the flotation tank 10 at a very slow velocity and without any significant change in pressure. This is so because the air-water solution flows very quietly from the vessel 11 into the liquid body at the depth of the vessel therein.

To make certain that only the air-water solution is delivered to the liquid body in the flotation tank, without any accompanying air bubbles, the vessel 11 is provided with a vent 20 through which air trapped in the upper part of the vessel is discharged. The upper open end 20a of the vent 20 is located above the flotation tank 10 for discharging vented air into the atmosphere. This is particularly important because, as is often desired, a greater quantity of air is supplied to the conduit 15 by the air pump 14 than can go into solution in liquid in the vessel 11.

Normally, a cushion of air is maintained continuously in the top part of the vessel 11. In order to insure that such an air cushion will be maintained, the vessel 11 can be provided with overflow protection, such as, for example, an additional discharge pipe (not shown) which is connected to the upper part of the vessel.

If desired, the passageway 18 of annular form can be replaced by one or more conduits having their inner ends connected to the openings 17. Such conduits, of course, will serve as pipes for discharging the solution of air and water from the vessel 11 to the body of liquid held in the flotation tank. In such an arrangement the vessel 11 itself necessarily need not be located in the flotation tank 10.

As shown in FIG. 1 the flotation tank 10 increases in cross-sectional area in an upward direction. The widening of the tank 10 becomes more pronounced at 21. In this way the pressure reduction causes the air dissolved in the water to be precipitated in the form of very small gas bubbles which adhere to the flock formed. This can be achieved by adding a precipitating agent, such as aluminum sulphate, for example, to the polluted water at a point before the liquid pump 12. Also, a so-called coagulant preferably is supplied to the conduit 15 from a vessel 22 through a conduit 22a in which a dosing pump 23 is connected. Since both the precipitating agent and the coagulant can act on the mixture of air and water in the vessel 11 for a long interval of time, the flocculation will be very effective. Moreover, since the solution of air and water flows gently in the tank 10 and the small air bubbles are formed very quietly with the absence of strong or vigorous liquid movements, the flocks will not be disintegrated. Since a great quantity of air is dissolved in the water and the air bubbles formed will not only be very small but present in a very great quantity, the precipitation of sludge will take place with very high efficiency.

The flotation tank 10 has a top opening 24 from which a widened portion 25 extends downward. The tank portion 25 has a bottom section 26 to which is connected a pipe 27 for discharging clean purified water. The precipitated sludge rises to the water surface at the opening 24 and flows over the edge 28 and the outer surface 29 of the widened portion 25 into a groove 30 extending about the latter. Sludge is discharged from the groove 30 through a conduit 31 connected thereto. In view of the foregoing it will now be understood that the removal of sludge can take place continuously in the manner just described. However, it is also possible to separate the sludge intermittently with the aid of a valve 32 in the discharge pipe 27 for clean or purified water.

The flotation apparatus embodying my invention can be employed for several different purposes. In the purification of water in lakes or streams, for example, the apparatus can take the form of a floating purification plant. Also, the apparatus can be of small or large size for effecting purification of waste water which is a by-product in industrial operations. In such industrial operations the rate at which polluted water is produced can vary considerably. However, it is not necessary to construct the vessel 11 for the largest possible rate at which polluted water is produced.

Figure 3:
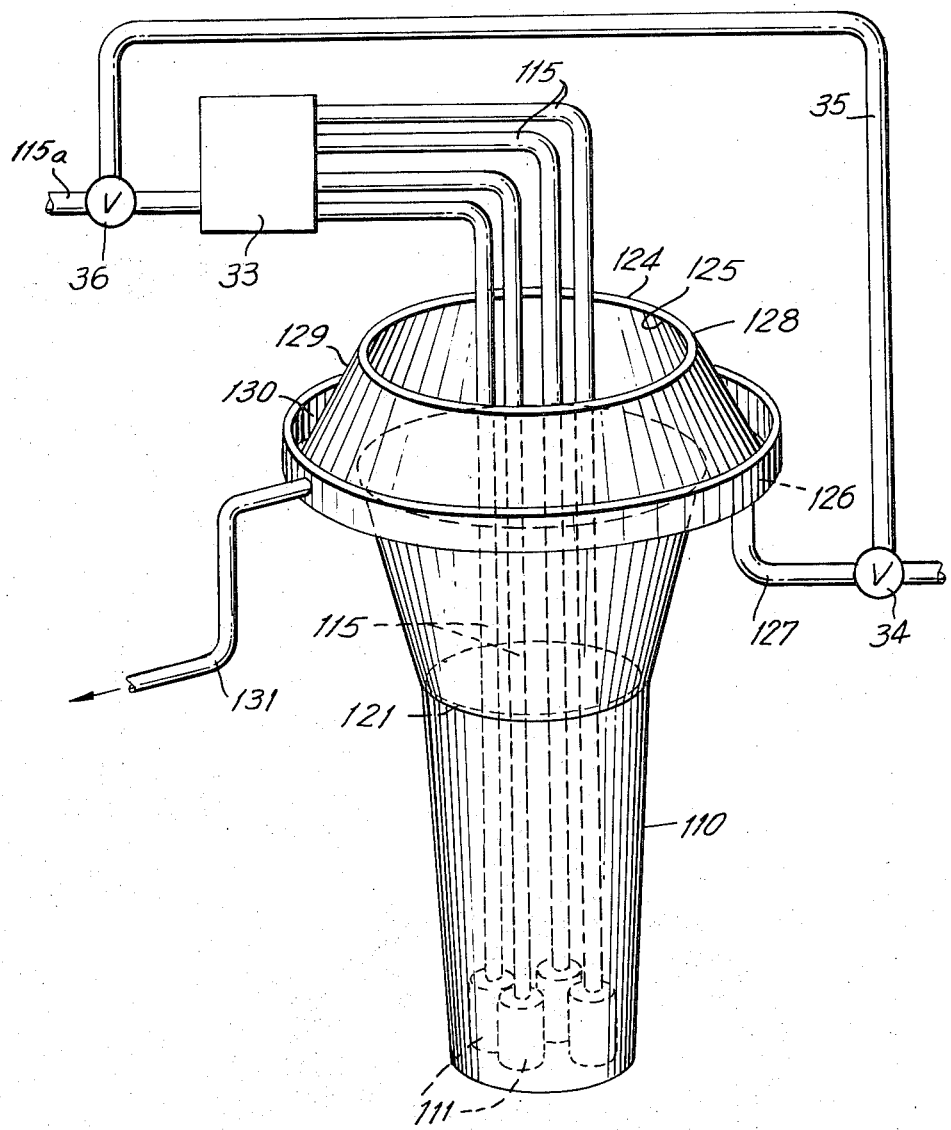
FIG. 3 is a view generally like that shown in FIG. 1 illustrating another embodiment of the invention.

In such case an embodiment can be employed which is like that shown in FIG. 3 in which parts similar to those illustrated in FIG. 1 are referred to by the same reference numerals to which 100 has been added. In FIG. 3 a flotation tank 110 is provided with a plurality of vessels 111 to which a mixture of air and polluted water is delivered through conduits 115 in which a distributing device 33 is connected. The waste polluted water produced by one or more industrial operations and air mixed therewith is delivered through a conduit 115a to the distributing device 33 which can be adjusted to render one or more conduits 115 operable to receive the mixture of air and water from conduit 115a depending upon the rate at which the mixture is supplied to the device 33. The apparatus of FIG. 3 may be provided with control means (not shown) which functions automatically to place one or more conduits 115 in communication with conduit 115a responsive to the rate of flow of the mixture of air and water to the device. In FIG. 3 sludge at the opening 124 flows over the edge 128 and outer surface 129 of the widened portion 125 into the annular groove 130 from which the sludge is discharged through a conduit 131.

When the supply of polluted water through the conduit 115a stops it is desirable that non-flotative water does not remain in the tank for the reason that, under these conditions, the flock formed may sink to the bottom and adversely affect the operation of the apparatus. In order to prevent such adverse operation I provide an arrangement in FIG. 3 for supplying clean water from discharge pipe 127 to the distributing device 33 through a conduit 35. Suitable valves 34 and 36 can be provided at the regions conduit 35 is connected to pipe 127 and conduit 115a, respectively, for controlling the flow of clean water from pipe 127 to the device 33. The valves 34 and 36 may be controlled automatically by a control device (not shown) which functions to open them when the flow of waste water through conduit 115a stops.

The flotation apparatus embodying my invention is extremely efficient. A factor that contributes to this high efficiency is that air is dissolved in the entire quantity of polluted water and not only in a small portion thereof, as is generally the case in known flotation apparatus.

I claim:

1. In apparatus for effecting purification of liquid, the combination of
   a. a flotation tank,
   b. a body of liquid to be purified in said tank,
   c. a vessel, The
   d. means for introducing under pressure to the bottom of said vessel for upward flow therein a mixture of air and liquid,
   e. means for discharging a solution of air and the liquid from the top of said vessel to the body of liquid in said flotation tank at a zone thereof below its liquid surface which is at a depth at least as great as the depth of said vessel to maintain the air and liquid in said vessel at a definite pressure,
   f. said vessel being so constructed and formed that air, at the definite pressure prevailing therein, will dissolve in the liquid and form the solution of air and the liquid during their upward flow in the vessel,
   g. said discharging means providing an obstructed path in which the solution of air and the liquid flows from the top of said vessel to said zone in said body of liquid in said flotation tank without any significant change in pressure, and
   h. means for removing undissolved air from the top of said vessel to the atmosphere so that only a solution of air and the liquid will flow from the top of said vessel to said flotation tank in the path of flow provided by said discharging means.

2. Apparatus as set forth in claim 1 in which said vessel includes stationary means therein for stirring the air and the liquid and promote mixing thereof.

3. Apparatus as set forth in claim 1 in which said discharging means provides the only path of flow of liquid to said flotation tank.

* * * * *